United States Patent [19]

Droste et al.

[11] Patent Number: 4,995,971
[45] Date of Patent: Feb. 26, 1991

[54] DUAL PURPOSE AUTOMATIC TRANSMISSION OIL PAN

[75] Inventors: Timothy A. Droste, Howell; Jerome J. Middione, Livonia; Himat B. Kher, Troy, all of Mich.

[73] Assignee: Ford Motor Company, Dearborn, Mich.

[21] Appl. No.: 390,022

[22] Filed: Aug. 7, 1989

[51] Int. Cl.⁵ .............................................. F01M 11/06
[52] U.S. Cl. ...................................... 210/168; 210/172; 210/222; 210/223; 74/467; 74/606 R; 184/6.2; 184/6.24; 184/6.25; 335/305
[58] Field of Search .............. 210/168, 222, 223, 172, 210/167; 74/467, 606 R; 184/6.2, 6.12, 6.24, 6.25; 335/305

[56] References Cited

U.S. PATENT DOCUMENTS

| | | |
|---|---|---|
| 1,024,579 | 4/1912 | Huff . |
| 2,622,699 | 12/1952 | Mills ..................................... 184/13 |
| 2,677,440 | 5/1954 | Willis ..................................... 184/6 |
| 2,976,999 | 3/1961 | Paton ..................................... 210/223 |
| 3,056,501 | 10/1962 | Thormau et al. ................... 184/6.24 |
| 3,151,703 | 10/1964 | Benk ..................................... 184/6 |
| 3,189,126 | 6/1965 | May ....................................... 184/6 |
| 3,354,988 | 11/1967 | Leonard ............................... 184/6 |
| 3,800,914 | 4/1974 | Miyata ................................ 184/6.25 |
| 3,869,391 | 3/1975 | Kramer ................................ 210/222 |
| 4,683,850 | 8/1987 | Bauder ............................. 123/195 C |
| 4,773,995 | 9/1988 | Kondo ................................ 210/222 |

Primary Examiner—Robert A. Dawson
Assistant Examiner—Matthew Savage
Attorney, Agent, or Firm—Kevin J. Heinl; Frank G. McKenzie; Keith L. Zerschling

[57] ABSTRACT

A dual purpose automatic transmission oil pan (10) for covering transmission components (20,22) and containing a reservoir of oil in a sump portion (32). First and second drainback channels (34,36) extend to the sump portion (32) from spaced drain openings (16,18) of a closed-barrel transmission case (14) which permit free flow of oil to the sump portion (32). A magnetic filter (40) is secured to a ramp surface (44) at the confluence of the oil flows (A,B) from the first and second drainback channels (34,36) for removing ferrous contaminants from the oil. An inlet port (26) of a filter cartridge opens into an inlet port region (46) of the sump portion (32).

14 Claims, 3 Drawing Sheets

DUAL PURPOSE AUTOMATIC TRANSMISSION OIL PAN

TECHNICAL FIELD

This invention relates to transmission oil pans which have a dual purpose of covering transmission components and containing a reservoir of fluid for operating the transmission. More particularly, the invention relates to automatic transmissions of the closed-barrel type having oil returning from the upper case of the transmission through spaced drainback openings. The oil is pumped from the reservoir through an oil filter cartridge having an inlet port opening into the sump portion.

BACKGROUND

Automatic transmissions for both two-wheel drive and four-wheel drive vehicles may have a closed-barrel design wherein automatic transmission fluid, hereinafter referred to as oil, is circulated through a hydraulic control circuit located in an upper case. Oil is pumped into the upper case for circulation through the valve body components, clutches and lubrication circuits and returned by means of drainback openings in the bottom of the upper case. Closed-barrel transmission cases tend to accumulate more transmission oil in the upper case region than prior art open barrel transmissions. Accumulation of oil in the upper case exacerbates problems relating to maintaining an adequate reservoir of oil for the oil pump.

An important problem addressed by oil pans for such transmissions is avoiding inadequate oil supply to the oil pump. The oil pump draws oil through an oil filter, which includes an inlet for drawing oil from the reservoir formed by the oil pan. If inadequate oil volume is contained in the reservoir, the inlet of the oil filter may draw air into the system and can cause cavitation or foaming of the oil.

In closed-barrel transmissions, restrictions in the oil flow paths in the upper case slow return of oil to the oil pan. Consequently, it is important that oil be allowed to flow freely from drainage points in the upper case.

It is an objective to maintain relatively high velocity oil flow in the oil pan so that sediment in the oil remains suspended until the oil is filtered. Prior art oil pans frequently include areas in the oil pan where oil flows slowly resulting in localized sedimentation.

When the vehicle is operated on hilly terrain, changes in the angular orientation of the transmission aggravate drainback problems. For example, when a vehicle proceeds up a hill, the oil flows to the rear of the transmission and returning oil is required to flow through the rear drainback opening. Drainback problems are also aggravated by cold temperatures. When the temperature of the transmission oil is reduced, its viscosity increases resulting in slower drainback.

When the transmission oil is at a low level, the probability of starvation of the oil pump increases. When the transmission is operating under normal conditions, less than ten percent (10%) of the transmission oil is retained in the oil pan.

A countervailing problem to the starvation problem is the problem of exceeding a maximum oil level of the transmission. An important consideration in transmission design is to maintain the oil level below the level of rotating elements in the transmission.

Transmission oil heated from ambient temperature by operation of the transmission undergoes thermal expansion. It is undesirable for thermal expansion to cause the maximum oil level of the transmission to be exceeded. It is an objective to lower the oil level as much as possible so that additional volume becomes available for thermal expansion. Ideally, adequate volumetric capacity is available in the transmission and in the transmission oil pan to avoid a transmission oil overfill condition when heated.

Prior art transmission oil pans addressed the starvation problem by providing an oil pan generally in the form of a large rectangular box-shaped member. The need for road clearance limits the depth of such oil pans. Large rectangular oil pans suffer from excessive shifting of the oil within the pan as the pan is tilted lengthwise. More oil is required to fill such pans adding expense without corresponding benefit. Large rectangular oil pans are also prone to deformation due to the lack of surface contour.

Oil de-aeration is an advantageous function of an oil pan wherein air bubbles in the oil are eliminated. The rate of oil de-aeration is a function of the volume of oil and the surface area of the reservoir in contact with air. To the extent that oil volume can be reduced and the oil level can be properly maintained while the surface area of oil in the pan in contact with air is increased, the rate of oil de-aeration can be improved.

Another function of an oil pan is to aid in cooling the oil. Oil pans having flat surfaces tend to have a lower surface area to volume relationship and do not offer enhanced cooling capabilities. Increasing the oil pan surface area exposed to ambient air results in an increase in the heat transfer rate of the oil pan.

It is frequently desirable to remove ferrous particles from the flowing transmission oil to avoid their recirculation through the transmission. Reducing oil flow velocity adjacent the magnetic filter improves the effectiveness of the magnetic filter by aiding in sedimentation in the area of the magnetic filter.

Magnetic filters of several designs have been proposed for filtration purposes. In U.S. Pat. No. 3,800,914 to Miyata, a contoured lubricant pan for use with an engine or transmission is disclosed which includes a rod-shaped filter disposed in a channel of a deep sump portion of the pan. The magnetic oil filter includes annular disks that are mounted on a rod. This and other prior art oil pans fail to provide a clear path from front and rear drainback openings to a sump.

Further, the prior art has failed to disclose the need for locating the oil sump at the cross-over point of the transmission wherein oil is maintained in an acceptable level under all reasonably foreseeable conditions. Reasonably foreseeable conditions are those conditions within the extremes of rear and front end inclination of the vehicle encountered when negotiating normal grades.

These and other problems are solved by the dual purpose automatic transmission oil pan of the present invention as summarized below.

SUMMARY OF THE INVENTION

The present invention relates to an oil pan having spaced oil drain openings through which oil is returned to the oil pan. The oil pan covers a filter cartridge and a plurality of valve body components which define a lower surface of the transmission. The filter cartridge includes an inlet port for drawing oil from the oil pan.

The oil pan of the present invention is a unitary member having a basewall and sidewalls adapted to be secured to the transmission case. The basewall of the oil pan is spaced from the lower surface defined by the valve body components and filter cartridge, and is contoured to correspond to the shape of the lower surface. The basewall defines a sump portion located intermediate the spaced drain openings. The sump portion receives the inlet port of the filter cartridge. First and second drainback channels are defined in the basewall and extend from directly below the spaced drain openings to the sump. First and second drainback channels provide a clear path to the sump from the respective drain openings. The first and second drainback channels are formed in the basewall, and are spaced further from the lower surface than the remaining portions of the basewall. The sump portion is spaced at an even greater distance from the lower surface than the first and second drainback channels.

According to another aspect of the present invention, an oil pan is provided in which first and second drainback channels open into the sump to form a confluence region wherein oil flowing through the first and second drainback channels drains into the confluence region of the sump. A magnetic filter is preferably located at the confluence region so that oil flowing through either or both drainback channels passes by the magnetic filter as it enters the sump. In a preferred embodiment, the magnetic filter is an annular washer secured to pedestals formed in the basewall of the oil pan which support the annular washer in a spaced relationship relative to the basewall to increase the surface area of the magnetic filter presented to the flowing oil.

An additional object of the invention is the provision of an oil pan in which the inlet port of the filter cartridge opens into an inlet port region of the sump which is spaced from the confluence region of the oil flows from the first and second drainback channels. The sump portion also further includes a ramp surface at the confluence region. The confluence region and inlet port region are aligned generally perpendicularly relative to the direction of oil flow in the first and second drainback channels. The magnetic filter is preferably retained on the ramp surface by magnetic attraction forces.

The sump portion of the oil pan of the present invention is located at the cross-over point defined by the level of oil at the minimum acceptable oil fill level when the rear and front ends of the vehicle are inclined to predetermined angular orientations. Consequently, the oil pan is adapted to assure an adequate oil supply regardless of extremes in vehicle inclination on uphill or downhill grades.

These and other objects and advantages are achieved by the present invention as will be more fully appreciated in view of the attached drawings and following detailed description.

DETAILED DESCRIPTION

Figure 1:
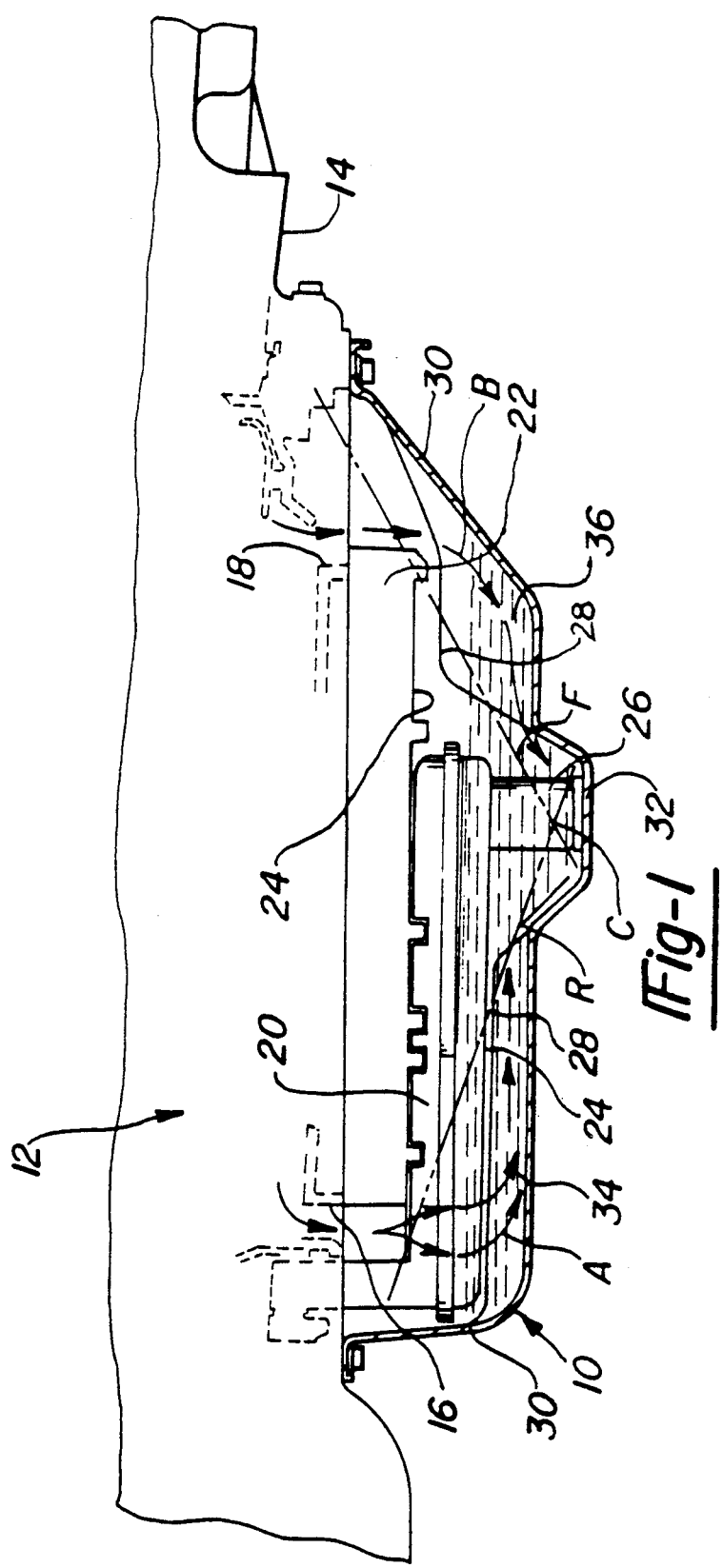
FIG. 1 is a fragmentary longitudinal side view, partially in section, of a transmission having the transmission oil pan of the present invention.

Referring now to FIG. 1, the oil pan 10 of the present invention is shown secured to a transmission 12. The transmission 12 has a closed-barrel transmission case 14. The transmission case 14 includes spaced drain openings 16 and 18, also referred to herein as a front drain opening 16 and a rear drain opening 18, through which oil is returned from the closed-barrel transmission case 14 to the oil pan 10. The oil pan 10 serves a dual purpose in that it covers and protects a filter cartridge 20 and valve body components 22 of the transmission 12 and also contains a reservoir of fluid for operating the transmission. The bottom surfaces of the filter cartridge 20 and valve body components 22 together form a lower surface 24 of the transmission to which the oil pan 10 is conformed. An inlet port 26 of the filter cartridge 20 extends below the lower surface 24. The inlet port 26 draws oil from the oil pan 10 into the filter cartridge 20 for circulation through the transmission 12.

The oil pan 10 includes a basewall 28 which is spaced from but contoured to closely follow the surface geometry of the lower surface 24 of the filter cartridge 20 and valve body components 22. The basewall 28 forms a substantially non-active surface in regard to return oil flow. The basewall 28 is surrounded by sidewalls 30 which extend between the basewall 28 and a mounting flange 29.

A sump portion 32 is formed in the basewall 28 of the oil pan 10. First and second drainback channels 34 and 36 extend from the spaced drain openings 16 and 18, respectively, to the sump portion 32. Spaced drain openings 16 and 18 are generally located in the front and rear of the transmission as illustrated. Assuming the usual orientation of the transmission with the oil pan at the bottom of the transmission 12, first and second drainback channels 34 and 36 are formed as depressions in the basewall 28 having a greater depth than the remaining portions of the basewall 28. The sump portion 32 is of even greater depth than the drainback channels 34 and 36. In other words, the drainback channels 34 and 36 are spaced from the lower surface 24 to a greater extent than the remaining portions of the basewall 28. The sump portion 32 is even more greatly spaced from the lower surface 24 than the drainback channels.

Figure 2:
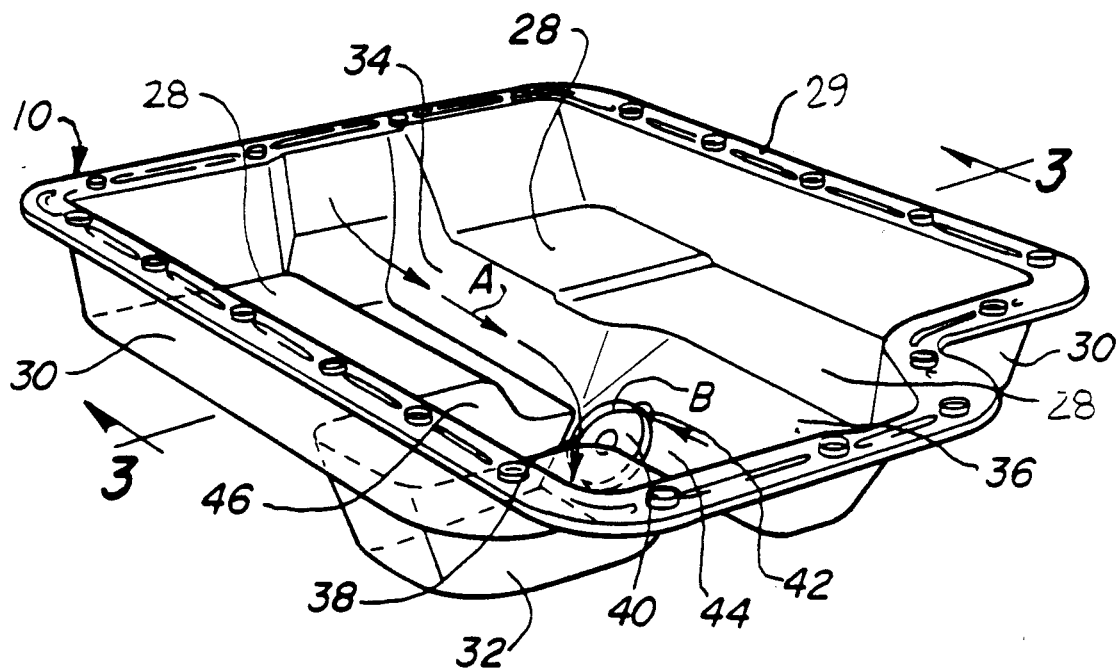
FIG. 2 is a perspective view of the transmission oil pan of the present invention.
Figure 3:
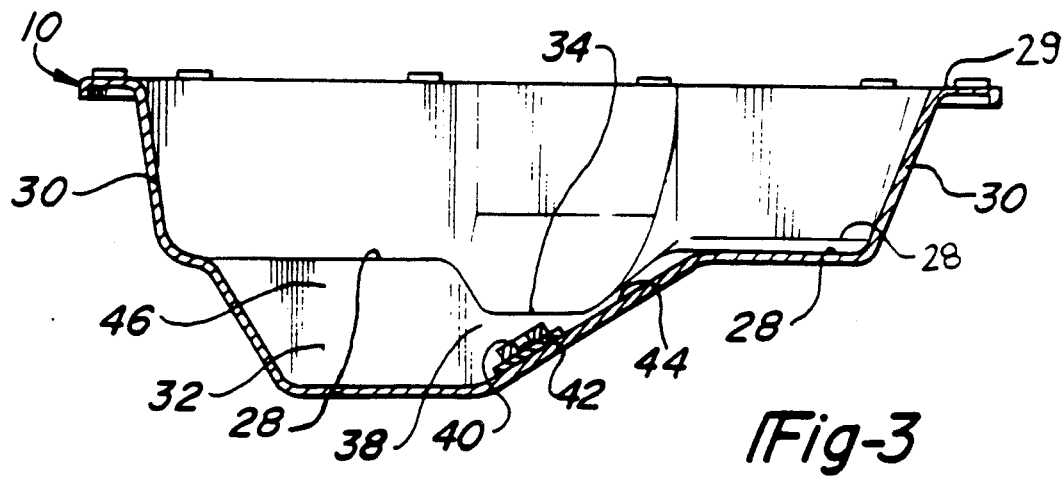
FIG. 3 is a cross-sectional view taken along the line 3—3 of FIG. 2.
Figure 4:
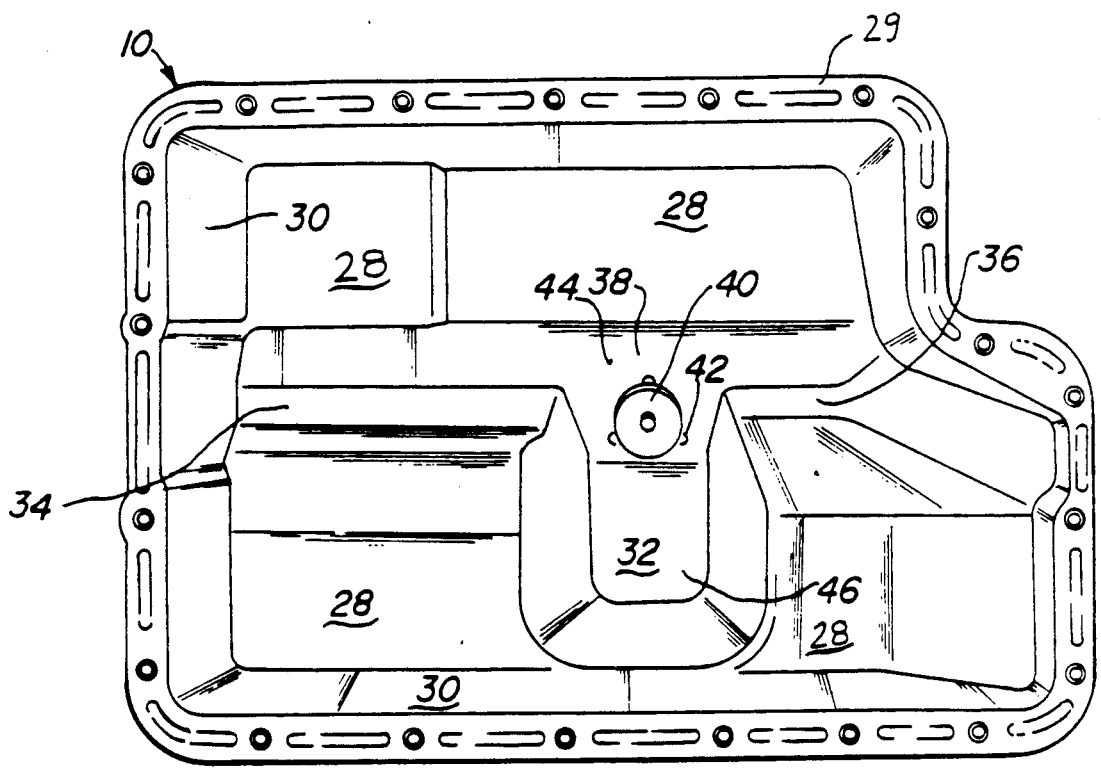
FIG. 4 is a plan view of the oil pan of the present invention.

Oil flow paths shown in FIGS. 1 and 2 by the arrows A and B illustrate the primary return oil flows in the oil pan. The flow path A illustrates the movement of oil from drain opening 16 through the first drainback channel 34 and into the sump portion 32 at a confluence region 38. Likewise, flow path B illustrates the flow of oil from the rear drain opening 18 through the second drainback channel 36 and into the sump portion 32 at the confluence region 38. While it is understood that some oil may traverse portions of the basewall 28, the primary flow paths are flow paths A and B. Oil in flow paths A and B have a clear path to the sump portion 32.

A magnetic filter 40 is preferably located in the confluence region 38 so that oil from flow paths A and B flow together and allow ferrous particles to be deposited on the magnetic filter 40 as the flows are admitted to the sump portion 32. The magnetic filter 40 is preferably magnetically retained on pedestals 42 formed on a ramp surface 44 in the sump portion 32. The pedestals 42 are preferably formed by sheet metal forming processes as the oil pan 10 is formed. The oil pan 10 is formed by sheet metal drawing and forming techniques that are well-known in the art.

An inlet port region 46 of the sump portion 32 is arranged on a line substantially perpendicular to the direction of flows A and B. The inlet port region 46 is preferably the deepest part of the sump portion 32. The inlet port 26 is disposed within the inlet port region 46 and is submerged in a relatively quiescent reservoir of oil as compared to oil in the confluence region 38.

The sump portion 32 is generally located to encompass a cross-over point C so that variations in oil level caused by the vehicle negotiating uphill and downhill grades are minimized. The cross-over point C is defined by measuring the oil level in the oil pan when the oil level is at a minimum level and the vehicle is lifted at its front and rear ends to predetermined levels. The phantom line F in FIG. 1 illustrates the approximate oil level at minimum fill conditions, or "add mark", when the front end of the vehicle is elevated as when the vehicle is operated on a sixty percent (60%) grade. A sixty percent grade is defined as a grade in which ten feet of forward movement would require six feet of vertical movement or approximately thirty-one degrees (31°). Similarly, the line R illustrates the oil level with the automatic transmission fluid at the add mark operated on a sixty percent (60%) grade with the rear of the vehicle elevated. These severe grade conditions represent testing parameters and are intended to assure complete submersion of the inlet port 26 under all reasonably foreseeable grade conditions.

The oil pan of the present invention is formed by sheet metal forming operations and results in an oil pan having enhanced structural rigidity. The formation of the drainback channels and sump in the oil pan enhances its torsional and bending strength.

The increased surface area of the oil pan resulting from the unique surface geometry improves oil cooling due to the increase in surface area exposed to ambient air.

The reduction of oil volume required by the transmission allowed the lowering of the oil level in the oil pan relative to the lower surface of the transmission which increased the oil surface area within the oil pan in contact with air in the oil pan. Increasing the oil surface area in contact with air in the oil pan increases the rate of oil de-aeration.

While a preferred embodiment of the present invention has been disclosed, the scope of the invention is intended to be construed within the scope of the following claims.

I claim:

1. An oil pan in combination with an automatic transmission of a vehicle utilizing oil including a transmission case adapted for movement with the vehicle in predetermined angular orientations when negotiating normal grades and having spaced oil drain openings, a filter cartridge having an inlet port, and a plurality of valve body components, said filter cartridge and valve body components defining a lower surface, the oil pan comprising:

a unitary member having a basewall and sidewalls adapted to be secured to the transmission case to cover the filter cartridge and valve body components;

said basewall being spaced from the lower surface and contoured to correspond to the shape of said lower surface, said basewall having a sump portion located intermediate the spaced drain openings, said sump portion adapted to receive the inlet port of the filter cartridge;

a first drainback channel defined in the basewall and extending from the one of said drain openings to the sump;

a second drainback channel defined in the basewall and extending from the other of said drain openings to the sump;

said first and second drainback channels being spaced further from said lower surface than said basewall, said first and second drainback channels open into said sump in a manner to form a confluence region therewith so that oil flowing through the first and second drainback channels drains onto a surface of the sump; and said sump portion being spaced further from said lower surface than both of said first and second drainback channels and cooperating with said drainback channels to maintain said inlet port submerged when said unitary member is secured to the transmission case.

2. In the oil pan of claim 1, a magnetic filter located at the confluence region.

3. The oil pan of claim 1, wherein the sump portion includes an inlet region spaced from the confluence region for receiving the inlet port of the filter cartridge.

4. The oil pan of claim 1, wherein said first and second drainback channels are further defined in said basewall to provide an unrestricted flow path from both drain openings to the sump.

5. The oil pan of claim 1, wherein said sump portion is further located to maintain a predetermined minimum acceptable oil fill level therein when said unitary member is secured to the transmission case irrespective of the angular orientation of said vehicle when negotiating normal grades.

6. The oil pan of claim 1 wherein the unitary member is sheet metal and the contour of said basewall, said sump portion and said drainback channels cooperate to provide the oil pan with enhanced structural rigidity and increased surface area for improved oil cooling.

7. The oil pan of claim 1 wherein said first and second drainback channels direct the flow of oil to the sump portion so as to assist filtration by suspending any sediment in the oil.

8. The oil pan of claim 1 wherein said first and second drainback channels are front and rear channels with respect to the vehicle.

9. An oil pan in combination with an automatic transmission of a vehicle utilizing oil including a transmission case adapted for movement with the vehicle in predetermined angular orientations when negotiating normal grades and having spaced oil drain openings, a filter cartridge having an inlet port, and a plurality of valve body components, said filter cartridge and valve body components defining a lower surface, the oil pan comprising:

a unitary member having a basewall and sidewalls adapted to be secured to the transmission case to cover the filter cartridge and valve body components;

said basewall being spaced from the lower surface and contoured to correspond to the shape of said lower surface, said basewall having a sump portion located intermediate the spaced drain openings, said sump portion adapted to receive the inlet port of the filter cartridge;

a first drainback channel defined in the basewall and extending from the one of said drain openings to the sump;

a second drainback channel defined in the basewall and extending from the other of said drain openings to the sump;

said first and second drainback channels being spaced further from said lower surface than said basewall, said first and second drainback channels open into said sump in a manner to form a confluence region therewith so that oil flowing through the first and second drainback channels drains onto a surface of the sump;

a magnetic filter formed as an annular washer secured to pedestals formed in the basewall of the oil pan located at the confluence region; and said sump portion being spaced further from said lower surface than both of said first and second drainback channels and cooperating with said drainback channels to maintain said inlet port submerged when said unitary member is secured to the transmission case.

10. An oil pan in combination with an automatic transmission of a vehicle utilizing oil including a transmission case adapted for movement with the vehicle in predetermined angular orientations when negotiating normal grades and having spaced oil drain openings, a filter cartridge having an inlet port, and a plurality of valve body components, said filter cartridge and valve body components defining a lower surface, the oil pan comprising:

a unitary member having a basewall and sidewalls adapted to be secured to the transmission case to cover the filter cartridge and valve body components;

said basewall being spaced from the lower surface and contoured to correspond to the shape of said lower surface, said basewall having a sump portion located intermediate the spaced drain openings, said sump portion adapted to receive the inlet port of the filter cartridge;

a first drainback channel defined in the basewall and extending from the one of said drain openings to the sump;

a second drainback channel defined in the basewall and extending from the other of said drain openings to the sump;

said first and second drainback channels being spaced further from said lower surface than said basewall, said first and second drainback channels open into said sump in a manner to form a confluence region therewith so that oil flowing through the first and second drainback channels drains onto a surface of the sump, said sump portion having an inlet region spaced from the confluence region for receiving the inlet region of the filter cartridge, said confluence region and inlet port region being aligned generally perpendicularly relative to the direction of oil flow in the first and second drainback channels; and said sump portion being spaced further from said lower surface than both of said first and second drainback channels and cooperating with said drainback channels to maintain said inlet port submerged when said unitary member is secured to the transmission case.

11. An oil pan in combination with an automatic transmission of a vehicle utilizing oil including a transmission case adapted for movement with the vehicle in predetermined angular orientations when negotiating normal grades and having spaced oil drain openings, a filter cartridge having an inlet port, and a plurality of valve body components, said filter cartridge and valve body components defining a lower surface, the oil pan comprising:

a unitary member having a basewall and sidewalls adapted to be secured to the transmission case to cover the filter cartridge and valve body components;

said basewall being spaced from the lower surface and contoured to correspond to the shape of said lower surface, said basewall having a sump portion located intermediate the spaced drain openings, said sump portion adapted to receive the inlet port of the filter cartridge;

a first drainback channel defined in the basewall and extending from the one of said drain openings to the sump;

a second drainback channel defined in the basewall and extending from the other of said drain openings to the sump;

said first and second drainback channels being spaced further from said lower surface than said basewall, said first and second drainback channels open into said sump in a manner to form a confluence region therewith so that oil flowing through the first and second drainback channels drains onto a surface of the sump, said sump portion having an inlet region spaced from the confluence region for receiving the inlet port of the filter cartridge, wherein said surface of the sump portion is an inclined ramp surface at the confluence region aligned in a direction perpendicular to the direction of oil flow in the first and second drainback channels, said ramp surface extending at progressively greater spacing from the lower surface from the point at which the first and second drainback channels enter the sump portion to the inlet region; and said sump portion being spaced further from said lower surface than both of said first and second drainback channels and cooperating with said drainback channels to maintain said inlet port submerged when said unitary member is secured to the transmission case.

12. In the oil pan of claim 11, a magnetic filter being retained magnetically on the ramp surface.

13. An oil pan comprising a unitary member having a basewall and sidewalls adapted to contain oil, said basewall being contoured to form a sump in one portion thereof and a plurality of drainback channels extending toward said sump from other spaced portions thereof, said drainback channels defining two distinct and convergent flow paths directing oil onto a surface of said sump and forming a confluence region in said sump wherein oil entering said sump from one of said drainback channel flows together with oil flowing from another of said drainback channels.

14. An oil pan comprising a unitary member having a basewall and sidewalls adapted to contain oil, said basewall being contoured to form a sump in one portion thereof and a plurality of drainback channels extending toward said sump and forming therewith a confluence region defined where the drainback channels open onto a surface of said sump to receive oil contained in said pan, and means in said confluence region located on said surface for removing magnetic material from said oil immediately after it is received in said sump from said drainback channels when said unitary member contains oil.

* * * * *